United States Patent [19]

Behre et al.

[11] 4,325,889
[45] Apr. 20, 1982

[54] PROCESS FOR THE PREPARATION OF 1-AMINO-8-NAPHTHOL-3,6-DISULPHONIC ACID (H-ACID)

[75] Inventors: Horst Behre, Odenthal; Albert Hullen, Langenfeld; Bruno Krüger, Cologne; Guido Steffan, Odenthal, all of Fed. Rep. of Germany

[73] Assignee: Bayer Aktiengesellschaft, Leverkusen, Fed. Rep. of Germany

[21] Appl. No.: 186,884

[22] Filed: Sep. 12, 1980

Related U.S. Application Data

[63] Continuation of Ser. No. 61,157, Jul. 26, 1979, abandoned.

[30] Foreign Application Priority Data

Aug. 4, 1978 [DE] Fed. Rep. of Germany ....... 2834166

[51] Int. Cl.$^3$ ............................................ C07C 143/66
[52] U.S. Cl. .................................................... 260/509
[58] Field of Search ......................................... 260/509

[56] References Cited

U.S. PATENT DOCUMENTS 4,111,979 9/1978 Kotera et al. ...................... 260/509
4,166,826 9/1979 Schössler et al. .................. 260/509
4,178,308 12/1979 Schössler et al. .................. 260/509

FOREIGN PATENT DOCUMENTS 2732291 2/1979 Fed. Rep. of Germany ...... 260/509

*Primary Examiner*—Nicky Chan
*Attorney, Agent, or Firm*—Sprung, Felfe, Horn, Lynch & Kramer

[57] ABSTRACT

The invention relates to a process for the preparation of 1-amino-8-naphthol-3,6-disulphonic acid (H-acid) as the mono-alkali metal salt from napthylamine-trisulphonic acid isomer mixtures by alkaline hydrolysis under pressure. The separation of the H-acid is effected by utilizing an aqueous sulphuric acid which contains naphthalene- and/or nitronaphthalene- and/or naphthylamine- and/or naphthol- and/or aminonaphthol-mono-, -di- and/or-tri-sulphonic acids.

5 Claims, No Drawings

PROCESS FOR THE PREPARATION OF 1-AMINO-8-NAPHTHOL-3,6-DISULPHONIC ACID (H-ACID)

This is a continuation of application Ser. No. 061,157, filed July 26, 1979, now abandoned.

The present invention relates to a process for the preparation of 1-amino-8-naphthol-3,6-disulphonic acid (H-acid) as the mono-alkali metal salt from naphthylaminetrisulphonic acid isomer mixtures by alkaline hydrolysis under pressure.

1-Amino-8-naphthol-3,6-disulphonic acid, frequently also referred to as H-acid, is an important intermediate product for the preparation of dyestuffs (see Ullmanns Enzyklopädie der Technischen Chemie (Ullmann's Encyclopaedia of Industrial Chemistry), 3rd edition, volume 12, page 621).

It is known from FIAT Final Report No. 1016, pages 32 to 39, that H-acid can be prepared as follows: naphthalene is reacted with sulphuric acid monohydrate (=100% strength $H_2SO_4$) and 65% strength oleum, a certain temperature programme being maintained and the sulphuric acid monohydrate and oleum being added stepwise, to give a naphthalene-trisulphonic acid isomer mixture which is nitrated with mixed acid. After diluting the mixture with water, driving off the nitrous fumes and removing the sulphuric acid as calcium sulphate, the isomer mixture of the nitronaphthalene-trisulphonic acids is reduced with iron and dissolved iron salts are then precipitated with magnesium oxide and separated off. The acid calcium-sodium salt of T-acid (1-naphthylamine-3,6,8-trisulphonic acid) is precipitated by adding sodium chloride and hydrochloric acid, and is filtered off and repeatedly washed. This salt is introduced into wash water and sodium carbonate is added. The calcium carbonate which has precipitated is then removed on a filter press and the salt solution is concentrated. The concentrated trisodium salt solution of T-acid is reacted with 50% strength sodium hydroxide solution under pressure. Thereafter first sulphuric acid and then water are added and finally the H-acid is isolated as the monosodium salt by filtration, washing and drying.

In this process, it is a disadvantage that the T-acid must be separated off as the acid calcium-sodium salt at an intermediate stage, producing a waste water which is extremely difficult and expensive to work up, since in addition to organic constituents it also contains large amounts of sodium chloride, calcium chloride and hydrochloric acid. The T-acid salt thus separated off also still contains sodium chloride, which can only be washed out under conditions entailing loss of T-acid. If the sodium chloride is left in the T-acid, the solution obtained after separating off the calcium carbonate cannot be concentrated further than to a concentration which, on titration of 100 g of solution, corresponds to a nitrite consumption of about 5.5 g, since otherwise salt deposition occurs, and does not permit continuous operation. However, for the subsequent reaction with sodium hydroxide solution it is desirable to have as concentrated a solution as possible in order to keep as low as possible the amount of alkali required to obtain a particular alkali concentration in the reaction mixture.

It is known from German Published Specification No. 2,727,345 to prepare 1-amino-8-naphthol-3,6-disulphonic acid (H-acid) as follows: a 1-nitronaphthalene-3,6,8-trisulphonic acid reaction mixture, obtained by trisulphonation of naphthalene and subsequent nitration, is reduced, the 1-naphthylamine-3,6,8-trisulphonic acid is isolated and fused with alkali, and 1-amino-8-naphthol-3,6-disulphonic acid is precipitated from the resulting alkali fusion mixture as the mono-alkali metal salt by mixing with the 1-nitronaphthalene-3,6,8-trisulphonic acid reaction mixture, and is isolated by filtration. The filtrate, containing 1-nitronaphthalene-3,6,8-trisulphonic acid, is used as starting material for the reduction reaction.

It is a disadvantage of this process that the entire highly diluted filtrate from the isolation of the monoalkali metal salt of 1-amino-8-naphthol-3,6-disulphonic acid, which in addition to 1-nitronaphthalene-3,6,8-trisulphonic acid contains the entire organic by-products and large amounts of alkali metal sulphate, must be employed in the reduction reaction with iron or other reducing agents and in the subsequent precipitation and filtering-off of 1-naphthylamine-3,6,8-trisulphonic acid as the acid alkali metal salt. This results in a low space/time yield. Furthermore, the 1-nitronaphthalene-3,6,8-trisulphonic acid, which is sensitive to alkali, is exposed to high local alkali concentration during the process of mixing with the alkali fusion mixture. This results ultimately in only an unsatisfactory yield of 1-amino-8-naphthol-3,6-disulphonic acid, relative to naphthalene employed, for the process as a whole.

A process for the preparation of 1-amino-8-naphthol-3,6-disulphonic acid mono-alkali metal salts by reacting a mixture of naphthylamine-trisulphonic acids and/or their salts with an alkali metal hydroxide solution at an elevated pressure and elevated temperature and subsequently separating out the 1-amino-8-naphthol-3,6-disulphonic acid in the form of a mono-alkali metal salt by acidification has now been found, which is characterised in that an aqueous sulphuric acid which contains naphthalene- and/or nitronaphthalene- and/or naphthylamine- and/or naphthol- and/or aminonaphthol-mono-, -di- and/or -tri-sulphonic acids is used for the acidification.

Suitable starting materials are, for example, naphthylaminetrisulphonic acid isomer mixtures obtained from the industrial preparation of T-acid. Mixtures which can be employed in the process according to the invention in general contain, relative to the total amount of diazotisable substances, more than 65% by weight of 1-naphthylamine-3,6,8-trisulphonic acid (T-acid). Preferably, mixtures which contain 70 to 90% by weight of 1-naphthamine-3,6,8-trisulphonic acid are employed. A naphthylaminetrisulphonic acid mixture to be employed particularly preferentially contains 75 to 85% by weight of 1-naphthylamine-3,6,8-trisulphonic acid, 5 to 15% by weight of 1-naphthylamine-3,5,7-trisulphonic acid, 1 to 10% by weight of 1-naphthylamine-4,6,8-trisulphonic acid, 0.5 to 5% by weight of 1-naphthylamine-2,5,7-trisulphonic acid, 0.1 to 2% by weight of 2-naphthylamine-3,5,7-trisulphonic acid, 0.1 to 2% by weight of 2-naphthylamine-4,6,8-trisulphonic acid and 0.1 to 2% by weight of 2-naphthylamine-3,6,8-trisulphonic acid.

Such mixtures can be obtained, for example, by trisulphonating naphthalene, nitrating the resulting mixture and reducing the nitro-naphthalenetrisulphonic acid mixture thus obtained. These reactions can be carried out in accordance with the initially described procedure of FIAT Final Report No. 16, pages 37 to 38, or by any other desired method.

The naphthylaminetrisulphonic acid mixture can contain the acids in the free form, in the form of neutral salts or in the form of acid salts. Mixtures which contain free acids and salts can also be used. If the naphthylaminetrisulphonic acids are present entirely or partially as salts, the alkali metal salts and alkaline earth metal salts, especially the sodium salts and potassium salts, are preferred. Naphthylaminetrisulphonic acid mixtures which contain the acids in the form of trisodium salts are very particularly preferred.

In addition to the naphthylaminetrisulphonic acids and their salts, the naphthylaminetrisulphonic acid mixture can also contain other products. Such products can in particular be by-products, decomposition products or unconverted intermediate products from the stages of the preparation of naphthylaminetrisulphonic acid, for example naphthalene-disulphonic acids, -trisulphonic acids and -tetrasulphonic acids, nitronaphthalene-mono-, -di- and -tri-sulphonic acids, naphthylamine-mono- and -di-sulphonic acids, for example 1-naphthylamine-3,6- and -5,7-disulphonic acid, and also dinaphthylsulphone-sulphonic acids and their amino and nitro derivatives, as well as oxidation products of naphthalene and/or of naphthalenesulphonic acids which may be formed during the sulphonation and/or the nitration.

The naphthylaminetrisulphonic acid mixture can be employed in the solid form or as an aqueous solution containing, for example, 20 to 50% by weight, preferably 30 to 40% by weight, calculated as free acid of molecular weight 383.

Suitable alkali metal hydroxide solutions for the process according to the invention are, in particular, aqueous potassium hydroxide or sodium hydroxide solutions. The use of potassium hydroxide solution gives better yields than sodium hydroxide solution, but the latter is in general more advantageous from the point of view of costs. Per mol of diazotisalbe substance (assumed to have molecular weight 383=T-acid) it is possible to employ, for example, 2.5 to 12 mols of alkali metal hydroxide. The use of 6 to 9 mols of alkali metal hydroxide per mol of diazotisable substance is particularly preferred. The concentration of alkali metal hydroxide in the reaction mixture can be, for example, 10 to 50% by weight (relative to the sum of alkali metal hydroxide+total water). Preferably, this concentration is 25 to 35% strength by weight.

The reaction can be carried out at temperatures of 150° to 250° C., preferably at 180° to 220° C., in a closed vessel. The pressure which hereupon results is in general completely adequate to effect the process according to the invention in a satisfactory manner. Of course, the process according to the invention can also be carried out at different pressures from those which arise autogenously in the closed vessel. For example, pressures in the range of 5 to 50 bar are possible for the process according to the invention.

The reaction time depends essentially on the reaction temperature and on the alkali metal hydroxide concentration. It is shorter at relatively high reaction temperatures and relatively high alkali metal hydroxide concentrations and longer at relatively low reaction temperatures and relatively low alkali metal hydroxide concentrations and is in general from 10 minutes to 10 hours. For example, at a reaction temperature of about 200° C., and with an alkali metal hydroxide concentration of 30% by weight, good results are obtained with a reaction time of one hour.

In carrying out the process according to the invention it is advantageous if advantageous alkali metal hydroxide concentrations prevail during the entire reaction. Hence, the preferred procedure is that the naphthylaminetrisulphonic acid isomer mixture and the greater part of the alkali metal hydroxide solution are pumped simultaneously, in the course of, for example, 5 to 30 minutes, preferably 10 to 20 minutes, into a small amount of initially introduced alkali metal hydroxide solution, and the mixture is then allowed to finish reacting. The starting materials are most advantageously introduced into the reaction vessel at a temperature such that after liberation of the heat of mixing and, where relevant, of the heat of neutralisation, the desired reaction temperature prevails. It is also possible to bring the starting materials together at lower temperatures and heat them, in the reaction vessel, to the desired reaction temperature.

After completion of the reaction, and befoe separating out the H-acid as the mono-alkali metal salt, it is advantageous to cool the reaction mixture and/or to dilute it with water. For example, it can be cooled to temperatures in the range from 20° to 150° C., preferably to temperatures in the range from 80° to 120° C. The amount of water which may have to be added depends on the reaction conditions, for example on the nature of the alkali metal hydroxide, its amount and its concentration. It is advantageous to select an amount of water such that the alkali metal sulphite formed during the reaction is dissolved.

To separate out the H-acid as the mono-alkali metal salt, aqueous waste sulphuric acids, which contain naphthalene- and/or nitronaphthalene- and/or naphthylamine- and/or naphthol- and/or aminonaphthol-mono-, -di- and/or -trisulphonic acids are used, according to the invention.

Such waste sulphuric acids can be obtained, for example, from the industrial preparation of the magnesium salt of 2-nitronaphthalene-4,8-disulphonic acid. The 2-nitronaphthalene-4,8-disulphonic acid can for example be prepared in accordance with Ullmann, Enzyklopädie der technischen Chemie (Encyclopaedia of Industrial Chemistry), 3rd edition, Volume 9, page 629 or in accordance with U.S. Pat. No. 1,756,537 or by any other desired method. Such waste sulphuric acid can for example contain a total of 1 to 10% by weight of naphthalene- and nitronaphthalene- mono-, -di- and -tri-sulphonic acids.

Furthermore, suitable waste sulphuric acids can be obtained from the industrial preparation of 2-naphthylamine-5,7-disulphonic acid (see, for example, Ullmanns Enzyklopädie der technischen Chemie (Ullmanns Encyclopaedia of Industrial Chemistry), 3rd edition, Volume 9, page 629). Such waste sulphuric acids can for example contain a total of 1 to 6% by weight of naphthylamine-mono-, -di- and trisulphonic acids.

Furthermore, suitable waste sulphuric acids can be obtained from the industrial preparation of naphthalene-1,5-disulphonic acid as the free acid or as the disodium salt (see, for example, FIAT, Final Report, No. 1016, pages 45 to 47). It is also possible to use waste sulphuric acids which arise from other methods of preparation of naphthalene-1,5-disulphonic acid. Such waste sulphuric acids can for example contain 10 to 30% by weight of naphthalene-mono-, -di- and -trisulphonic acids, and may contain sodium ions.

The abovementioned waste sulphuric acids can be used individually, or as any desired mixtures with one another, for separating out the H-acid, in accordance with the invention. The waste sulphuric acids may additionally also contain alkali metal ions and/or magnesium ions. For example, the waste sulphuric acids can contain 30 to 60% by weight of $H_2SO_4$, relative to $H_2SO_4$ plus water.

It is advantageous if the waste sulphuric acids, before being used for precipitating the H-acid, are filtered and/or mixed with water and/or with fresh sulphuric acid.

To avoid losses of yield when separating out the H-acid and to achieve a very good quality of H-acid it is advantageous to determine separately, in the case of each waste sulphuric acid or waste sulphuric acid mixture, with what additions of fresh sulphuric acid and, where appropriate, water the best results are achieved.

For example, in general good results were obtained if at least 0.25 mol of fresh sulphuric acid is added per mol of waste sulphuric acid from the preparation of the magnesium salt of 2-nitronaphthalene-4,8-disulphonic acid. When using waste sulphuric acid from the preparation of 2-naphthylamine-5,7-disulphonic acid it is in general not necessary to add fresh sulphuric acid in order to achieve good results, but on the other hand the addition of fresh sulphuric acid does not have any technically disadvantageous consequences.

When using waste sulphuric acid/fresh sulphuric acid mixtures it is in general not necessary to employ more than 1 mol of fresh sulphuric acid per mol of waste sulphuric acid. The concentration of the fresh sulphuric acid can be chosen as desired and can be, for example, between 20 and 80% by weight. Preferably, 40 to 60% strength by weight fresh sulphuric acid is used.

The concentration of the sulphuric acid or of the sulphuric acid mixture which is used for the acidification in order to separate out 1-amino-8-naphthol-3,6-disulphonic acid as the mono-alkali metal salt can also be varied within a wide range, for example between 20 and 80% by weight. Preferably, this concentration is in the range from 30 to 60% by weight. These concentrations can be varied by, for example, adding water and/or fresh sulphuric acid of a suitable concentration.

To separate out the H-acid, the amount of waste sulphuric acid and/or of waste sulphuric acid/fresh sulphuric acid mixture added is such that the sparingly soluble mono-alkali metal salt of H-acid is formed. Advantageously, steps are taken, by appropriate selection of the concentration of the waste sulphuric acid and/or by adding water before and/or during the addition of the waste sulphuric acid, to ensure that the inorganic salt formed, for example sodium sulphate or potassium sulphate, does not precipitate. For example, good results can be obtained if, in order to separate out the H-acid as the mono-alkali metal salt, the pH is adjusted to a value in the range from 0 to 4, preferably 0.5 to 2.5, and an amount by weight of water which is 0.1 to 5 times, preferably 0.5 to 2 times, the weight of the mixture present in the pressure hydrolysis is introduced by dilution with water and/or by appropriate selection of the concentration of the waste sulphuric acid. The mono-alkali metal salt of the H-acid can be separated off in the usual manner, for example by filtration. It is advantageous if, before separating off the mono-alkali metal salt of H-acid, the temperature is brought to below 80° C. by cooling, for example by evaporative cooling, and the salt is then separated off at a temperature below 80° C. Preferably, it is separated off at a temperature in the range from 20 to 60° C.

In order to remove sulphur dioxide completely it is advantageous, after setting up the precipitation conditions and before separating off the mono-alkali metal salt of the H-acid, to boil the acidified and diluted mixture under reflux, or keep it under vacuum, for some time, for example 0.5 to 2 hours, or to flush out the sulphur dioxide with an inert gas, for example nitrogen.

The mono-alkali metal salt of H-acid obtained after the separation procedure is usually washed with water and dried, for example in vacuo.

Using the process according to the invention, the mono-alkali metal salt of H-acid which is formed can be isolated in virtually quantitative yield and in very high purity (for example 98-99% relative to total organic compounds present).

This is very surprising since even in the mixture obtained after the pressure hydrolysis about 25 different components can be identified and a substantial number of further minor components are introduced into the reaction mixture through the waste sulphuric acid employed.

The process according to the invention offers substantial advantages over the previously customary alkaline pressure hydrolyses of isolated T-acid followed by separating-out of the H-acid with fresh sulphuric acid, and is therefore particularly economical. Thus, firstly, there is a substantial saving of sulphuric acid. Secondly, there is a substantial reduction in the production—which is technologically difficult to control—of dilute acid in the overall process of manufacture of the so-called letter-identified acids (dyestuff intermediates based on naphthalene). Compared to the previous process, the amounts of total waste water and salt are very greatly reduced.

EXAMPLE 1

The following are introduced into a 2.7 liter nickel autoclave, and heated to 180° C.: 580 g of a naphthylaminetrisulphonic acid mixture in the form of the trisodium salts (strength 11.9 g of total nitrite/100 g, 52.8% by weight of T-acid of molecular weight 383; total 69 g of nitrite, 0.80 mol of T-acid) of the following composition:

1-naphthylamine-3,6,8-trisulphonic acid: 80.0%
1-naphthylamine-3,5,7-trisulphonic acid: 8.5%
1-naphthylamine-4,6,8-trisulphonic acid: 4.0%
1-naphthylamine-2,5,7-trisulphonic acid: 3.0%
2-naphthylamine-3,5,7-trisulphonic acid: 1.2%
2-naphthylamine-4,6,8-trisulphonic acid: 0.7%
2-naphthylamine-3,6,8-trisulphonic acid: 0.5%
(% contents in each case relative to diazotisable substance), which mixture additionally contains 0.3% by weight of the disodium salt of 1-naphthylamine-3,6-disulphonic acid, 1.3% by weight of the trisodium salt of naphthalene-1,3,6-trisulphonic acid, 0.6% by weight of the trisodium salt of 1-nitronaphthalene-3,6,8-trisulphonic acid, 4.6% by weight of water and certain amounts, not determinable quantitatively, of amino derivatives and nitro derivatives of dinaphthylsulphone-sulphonic acids and of oxidation products of naphthalene and of naphthalene-trisulphonic acids, and 400 g of water. 600 g of 50% strength by weight sodium hydroxide solution (7.5 mols of NaOH) are heated to 185° C. in a 1.3 liter steel autoclave and are forced, by means of nitrogen, into the 2.7 liter autoclave, whereby—relative to the total water—a 30% strength by weight sodium hydroxide solution is produced. At the same time, the temperature assumes a value of 200°

C. The reaction mixture is kept at 200° C. for 45 minutes and is then cooled as rapidly as possible to 100° C., and is diluted with 400 g of water. The hot reaction solution is acidified to pH 1–1.5, the pH being controlled, by means of 1,100 g of a mixture of one part by weight of 48% strength by weight $H_2SO_4$ and one part by weight of a waste sulphuric acid from the isolation of the magnesium salt of 2-nitronaphthalene-4,8-disulphonic acid, the waste sulphuric acid having the following composition: 42% by weight of $H_2SO_4$, 2.2% by weight of nitronaphthalene-disulphonic and -trisulphonic acids, 2.2% by weight of naphthalene-disulphonic and -trisulphonic acids, 0.25% by weight of magnesium ions, 2.6% by weight of organically bonded carbon, 0.15% by weight of organically bonded nitrogen and 1.9% by weight of organically bonded sulphur; the mixture is then heated under reflux for one hour to remove sulphur dioxide completely, is cooled to 40° C. by evaporative cooling and is kept at 40° C. for 2 hours. The product is filtered off at 40° C., washed with a total of 500 g of water and dried in vacuo at 80° C.

The yield is 57%, relative to T-acid isomer mixture or 71.5% relative to T-acid. The H-acid quality was assessed by high pressure liquid chromatography to be the following:
monosodium salt of H-acid: 88.2%
monosodium salt of 1-naphthylamine-3,6-disulphonic acid: 0.1%
monosodium salt of W-acid: below 0.1%
disodium salt of chromotropic acid: 1.1%
disodium salt of T-acid: 0.2%
water: 9.5%
sodium sulphate: 0.4%
magnesium: below 5 ppm Reaction products from the isomeric naphthylamine-trisulphonic acids and minor components from the waste sulphuric acid were not detectable in the isolated product.

EXAMPLE 2

The procedure followed was as in Example 1, but the reaction mixture, cooled to 100° C., was diluted with 300 g of water and the solution was acidified, under pH control (pH 1 to 1.5) with 1,200 g of waste sulphuric acid from the isolation of 2-naphthylamine-5,7-disulphonic acid, the waste sulphuric acid having the following composition:
41% by weight of $H_2SO_4$
3.2% by weight of naphthylamine-disulphonic and -trisulphonic acids.

The yield is 56% relative to T-acid isomer mixture or 70% relative to T-acid. The quality of the H-acid was assessed by high pressure liquid chromatography to be the following:
monosodium salt of H-acid: 88.5%
monosodium salt of W-acid: 0%
monosodium salt of 1-naphthylamine-3,6-disulphonic acid: 0.1 to 0.2%
disodium salt of chromotropic acid: 0.9 to 1.1%
disodium salt of T-acid: 0.1 to 0.2%
water: 9.5%
sodium sulphate: 0.3%

2-Naphthylamine-disulphonic and -trisulphonic acids from the waste sulphuric acid were not detectable in the isolated product.

EXAMPLE 3

The procedure followed was as in Example 1, but the reaction mixture, cooled to 100° C., was diluted with 300 g of water and the solution was acidified, under pH control (pH 1 to 1.5) with 1,200 g of waste sulphuric acid from the isolation of naphthalene-1,5-disulphonic acid, the waste sulphuric acid having the following composition:
33% by weight of $H_2SO_4$
22.4% by weight of naphthalene-disulphonic and -trisulphonic acids.

The yields and contents mentioned in Example 2 were obtained.

Naphthalene-disulphonic and -trisulphonic acids from the waste sulphuric acid were not detectable by means of high pressure liquid chromatography in the isolated product.

EXAMPLE 4 a–g

The procedure in Example 1 was followed, but the alkaline reaction solution, cooled to 100° C. and diluted with 400 g of water, was acidified with mixtures of the various waste sulphuric acids from Examples 1 to 3 and/or fresh sulphuric acid. The results are summarised in Table 1.

TABLE 1

| | Precipitant (in each case parts by weight) | | | Yield (g) | Quality (in each case %) | | | | |
|---|---|---|---|---|---|---|---|---|---|
| Example | 50% strength by weight fresh $H_2SO_4$ | Waste $H_2SO_4$ from the preparation of 2-nitro-napthalene-4,8-disulphonic acid | Waste $H_2SO_4$ from the preparation of 2-naphthyl-amine-5,7 disulphonic acid | Waste $H_2SO_4$ from the preparation of naphthelen-1,50 disulphonic acid | H-acid (molecular weight 319) per kg of reaction solution | H-acid (molecular weight 319) | 1-Naphthyl-amine-5,6-disulphonic acid (molecular weight 303) | W-acid (molecular weight 319) | Chromotropic acid (molecular weight 320) | T-acid (molecular weight 383) |
| 4a+ | 1 | 0 | 0 | 0 | 93.4 | 80.3 | 0.1 | 0 | 1.0 | 0.2 |
| 4b | 2 | 1 | 0 | 0 | 93.8 | 80.8 | 0.1 | 0 | 1.1 | 0.2 |
| 4c | 1 | 2 | 0 | 0 | 91.6 | 79.4 | 0.1 | 0 | 1.4 | 0.2 |
| 4d | 1 | 0 | 1 | 0 | 93.3 | 81.3 | 0.2 | 0 | 0.9 | 0.1 |
| 4e | 2 | 1 | 1 | 0 | 92.9 | 80.4 | 0.2 | 0 | 1.0 | 0.1 |
| 4f | 1 | 0 | 0 | 1 | 93.4 | 79.6 | 0.1 | 0.2 | 1.1 | 0.2 |
| 4g | 1 | 1 | 1 | 1 | 92.7 | 80.1 | 0.2 | 0.2 | 1.2 | 0.2 |

+not according to the invention; for comparison

What is claimed is:
1. In a process for the preparation of a 1-amino-8-naphthol-3,6-disulphonic acid mono-alkali metal salt wherein a mixture of naphthylamine-trisulphonic acids and/or their salts is reacted with an alkali metal hydroxide solution at an elevated pressure and elevated temperature and the 1-amino-8-naphthol-3,6-disulphonic acid is subsequently separated out in the form of a mono-alkali metal salt by acidification, the improvement which comprises using for acidification a 30 to 60% strength by weight—relative to $H_2SO_4$ plus water—waste sulphuric acid (a) from the precipitation of the magnesium salt of 2-nitronaphthalene-4,8-disulphonic acid, which waste acid contains 1 to 10% by weight of naphthalene- and nitronaphthalene-mono-, -di- and tri-sulphonic acids, (b) from the precipitation of 2-naphthylamine-5,7-disulphonic acid, which waste acid contains 1 to 6% by weight of naphthylamine-mono-, -di- and -tri-sulphonic acids, or (c) from the precipitation of naphthalene-1,5-disulphonic acid, which waste acid contains 10 to 30% by weight of naphthalene-mono-, di- and -tri sulphonic acids and may contain sodium ions.

2. Process according to claim 1, characterized in that the waste sulphuric acid has been subjected to at least one of (A) filtering, (B) mixing with water and (C) mixing with fresh sulphuric acid before being used to precipitate the H-acid.

3. Process according to claim 1, characterized in that a mixture of the waste sulphuric acids, optionally mixed with fresh sulphuric acid, water or sulphuric acid and water, are employed to separate out H-acid.

4. Process according to claim 1, characterized in that in order to separate out the H-acid, the pH is brought to a value in the range from 0 to 4.

5. Process according to claim 1, characterized in that before separating off the mono-alkali metal salt of H-acid, the mixture is cooled to a temperature below 80° C.

* * * * *